J. C. Butterfield and James Hay,

Improved Trip Hammer.

4470

Fig 3 REISSUED JUL 18 1871

Witness
Wm H. Lotz
R. Crane

Inventors
John C. Butterfield
James Hay

UNITED STATES PATENT OFFICE.

JOHN C. BUTTERFIELD AND JAMES HAY, OF CHICAGO, ILLINOIS.

IMPROVEMENT IN TRIP-HAMMERS.

Specification forming part of Letters Patent No. 108,326, dated October 18, 1870; reissue No. 4,470, dated July 18, 1871.

*To all whom it may concern:*

Be it known that we, JOHN C. BUTTERFIELD and JAMES HAY, of Chicago, in the county of Cook and State of Illinois, have invented certain Improvements in Trip-Hammers, of which the following is a specification:

The nature of this invention consists in the novel construction of a vibrating frame, carrying rubber or other springs, in combination with a hammer and other parts, whereby a very effective blow from the hammer is obtained and also other important features secured, as will appear from the subjoined description.

Figure 2:
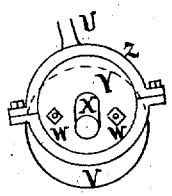
Figure 2:
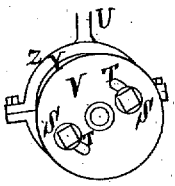
Figure 1:
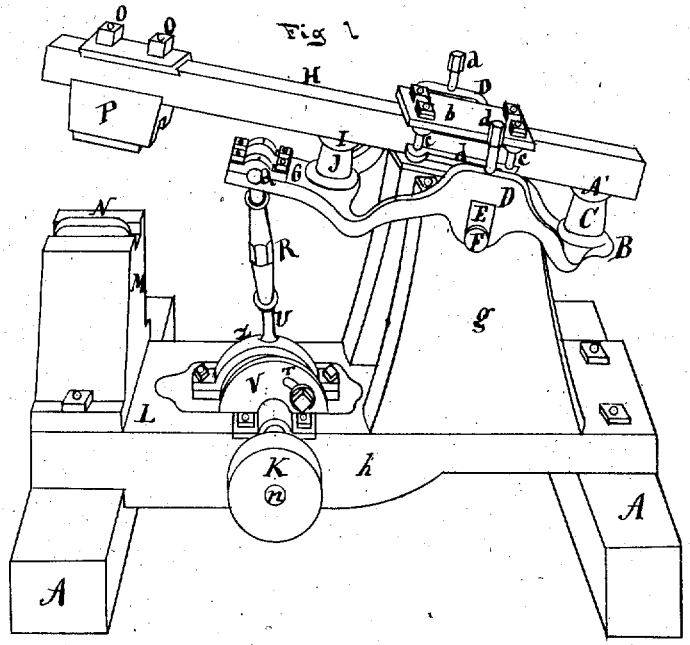

Figure 1 is a perspective view of the invention. Figs. 2 and 3 are detached views of the adjustable eccentric.

L, Fig. 1, represents a substantial frame, supported by any suitable foundation, A A, and which supports an upright standard or standards, *g g*, and an anvil, M N. A vibrating frame, D, is provided with a shaft or pivot, F, which vibrates or rocks in standards *g*. Upon the frame D, and near the ends thereof, are placed rubber or other springs J C. A hammer-beam, H, with a hammer, P, attached, is also, by means of a clamp, *b d*, or other suitable device, hung upon the rock-shaft F and supported by the uprights *g g*. When the hammer-beam H and frame D are in proper position the springs J C are somewhat compressed, and are kept in their places by means of the sockets G B and I A′, or other suitable means. The springs J C can be readily adjusted by means of the screws *a a*, as these screws pass through the sides of the frame D and press upon sliding boxes E, which rest upon the shaft F. *c c* are compression-screws or bolts for griping the plates *b d* upon the beam H. The end of the frame D nearest the hammer is provided with a short shaft or pin, Q, to which is attached one end of a rod, U. The other or lower end of said rod is provided with a strap, Z, which embraces an eccentric, Y, which rotates in said strap Z when in use. The rod U is divided near the center, and has the ends where such division is made screwed or threaded with a screw-thread, one end having a right and one end a left-hand thread. Upon these ends is placed a hollow sleeve, R, having in the interior of each end a female screw corresponding to the right and left-hand threads of the rod U. By this means the rod U may be varied in length as may be desired. A shaft, *n*, having a driving-pulley, K, attached, is placed in suitable bearings upon the frame L, nearly underneath the pin Q. Near the center of the shaft *n* is firmly fixed to said shaft a plate, V, provided with tangential slots T T. The eccentric Y is clamped to the plate V by means of the bolts S S, but of itself is not rigidly fastened to the shaft *n*, the said eccentric being provided with sufficient play upon the shaft *n* to allow for the bolts S S being moved tangentially to the shaft in the slots T T. By this tangential movement the eccentricity of the eccentric Y may be increased or diminished, and hence a longer or shorter stroke of the rod U, as desired.

Having thus described our invention, what we claim as new, and desire to secure by Letters Patent, is—

1. The combination of the frame D and springs J C with the hammer-beam H and hammer P, when made as and for the purposes hereinbefore specified.

2. The combination of the frame D and springs J C with the hammer-beam H, the hammer P, and shaft F, when made and operating in the manner hereinbefore specified.

3. The combination of the frame D and springs J C with the hammer-beam H, shaft F, and standards *g g*, when made and operating in the manner and for the purposes hereinbefore specified.

4. The combination of the frame D, the springs J C, and hammer-beam H with the adjustable sleeve R, rod or pitman U, the eccentric Y, and plate V, when made and operating in the manner hereinbefore specified.

5. The combination of the frame D, the springs J C, and hammer-beam H with the adjustable sleeve R, the pitman U, and eccentric Y, when made and operating in the manner hereinbefore specified.

6. The combination of the frame D, the springs J C, and hammer-beam H with the pitman U, strap Z, eccentric Y, and plate V, when made and operating in the manner hereinbefore specified.

7. The combination of the frame D and springs J C with the hammer-beam H, the pitman U, the adjustable sleeve R, the eccentric Y, and shaft *n*, when made as and for the purposes hereinbefore specified.

JOHN C. BUTTERFIELD.
JAMES HAY.

Witnesses:
GEO. G. HUNT,
N. N. FISKE.